United States Patent
Waller et al.

(10) Patent No.: US 10,235,105 B1
(45) Date of Patent: Mar. 19, 2019

(54) MICROSERVICE ARCHITECTURE WORKFLOW MANAGEMENT MECHANISM

(71) Applicant: Ricoh Company, Ltd., Tokyo (JP)

(72) Inventors: Marquis G. Waller, Beverly, OH (US); Joseph Wayne Stradling, Firestone, CO (US); Michael Glen Lotz, Longmont, CO (US); Jeffrey Alan Sikkink, Longmont, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/906,740

(22) Filed: Feb. 27, 2018

(51) Int. Cl.
- G06F 15/00 (2006.01)
- G06F 3/12 (2006.01)
- G06K 1/00 (2006.01)
- H04L 12/24 (2006.01)

(52) U.S. Cl.
CPC .......... *G06F 3/1205* (2013.01); *G06F 3/124* (2013.01); *G06F 3/1263* (2013.01); *H04L 41/5054* (2013.01)

(58) Field of Classification Search
CPC ...... G06F 3/1205; G06F 3/124; G06F 3/1263; H04L 41/5054
USPC ................. 358/1.1, 1.13, 1.14, 1.15
See application file for complete search history.

(56) References Cited

U.S. PATENT DOCUMENTS

| | | | |
|---|---|---|---|
| 5,511,177 A | 4/1996 | Kagimasa et al. | |
| 6,088,679 A | 7/2000 | Barkley | |
| 8,619,269 B2 | 12/2013 | Jahn et al. | |
| 8,713,070 B2 | 4/2014 | Nakazato et al. | |
| 9,164,811 B1 | 10/2015 | Valeriano | |
| 2005/0275875 A1* | 12/2005 | Jennings, Jr. | G06F 3/1205 358/1.15 |
| 2007/0229881 A1* | 10/2007 | Matsubara | G06F 3/1204 358/1.15 |
| 2011/0145037 A1 | 6/2011 | Domashchenko et al. | |
| 2014/0025425 A1 | 1/2014 | Chalana et al. | |
| 2015/0039382 A1 | 2/2015 | Kim | |
| 2015/0356476 A1 | 12/2015 | Agarwal et al. | |
| 2016/0162819 A1 | 6/2016 | Hakman et al. | |

FOREIGN PATENT DOCUMENTS

GB 2481820 A 11/2012

OTHER PUBLICATIONS

Wang, L., Tao, J., Ranjan, R. et al. (2013). G-Hadoop: MapReduce across distributed data centers for data-intensive computing. Future Generation Computer Systems 29(3), pp. 739-750.

* cited by examiner

Primary Examiner — Douglas Q Tran
(74) Attorney, Agent, or Firm — Jaffery Watson Mendonsa & Hamilton LLC

(57) ABSTRACT

A system to generate perform document optimizations is described. The system includes at least one physical memory device and one or more processors coupled with the at least one physical memory device, the one or more processors to receive a print file including one or more print jobs to be processed, determine a number of processing steps to be implemented to process the print file, generate a microservice corresponding to each of the step components and process each of the step components via a corresponding microservice.

20 Claims, 9 Drawing Sheets

MICROSERVICE ARCHITECTURE WORKFLOW MANAGEMENT MECHANISM

FIELD

This invention relates generally to the field of print services. More particularly, the invention relates to a print services workflow management process.

BACKGROUND

Entities with substantial printing demands typically implement a high-speed production printer for volume printing (e.g., one hundred pages per minute or more). Production printers may include continuous-forms printers that print on a web of print media stored on a large roll. A production printer typically includes a localized print controller that controls the overall operation of the printing system, and a print engine that includes one or more printhead assemblies, where each assembly includes a printhead controller and a printhead (or array of printheads).

Recently, the establishment of infrastructures called cloud services in which services are provided by a server system connected to the Internet, has been in progress. Print services for printing over the Internet have also been provided. The services offer functions of generating and distributing print data with a server on the Internet at the request of a print device. Currently, systems that provide such print services by using the aforementioned Cloud are being developed.

Cloud systems typically implement a workflow management system to manage the production of large scale print and copy jobs. Functions of a workflow management system include meeting Service Level Agreements (SLAs) and identifying potential problems that may occur during the processing of jobs. One problem that conventional workflow management systems are able to identify, but often cannot remedy, is a significant increase in the volume of work that is to be performed by the print services. For instance, a print service may result from an increase in business, which may result in the overwhelming of compute resources.

Once the compute resources become overwhelmed, throughput for all jobs may be significantly slowed, leading to missed SLAs. One solution is to acquire more compute resources. However, the additional resources may also eventually become inadequate, or the increase in volume may only be a short term occurrence, thus not worthy of a long term investment.

Accordingly, an improved workflow management mechanism is desired.

SUMMARY

In one embodiment, a method is disclosed. The method includes receiving a print file including one or more print jobs to be processed, determining a number of processing steps to be implemented to process the print file, generating a microservice corresponding to each of the step components and processing each of the step components via a corresponding microservice.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

A workflow management mechanism implemented in a cloud print services environment is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "unit" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 1:
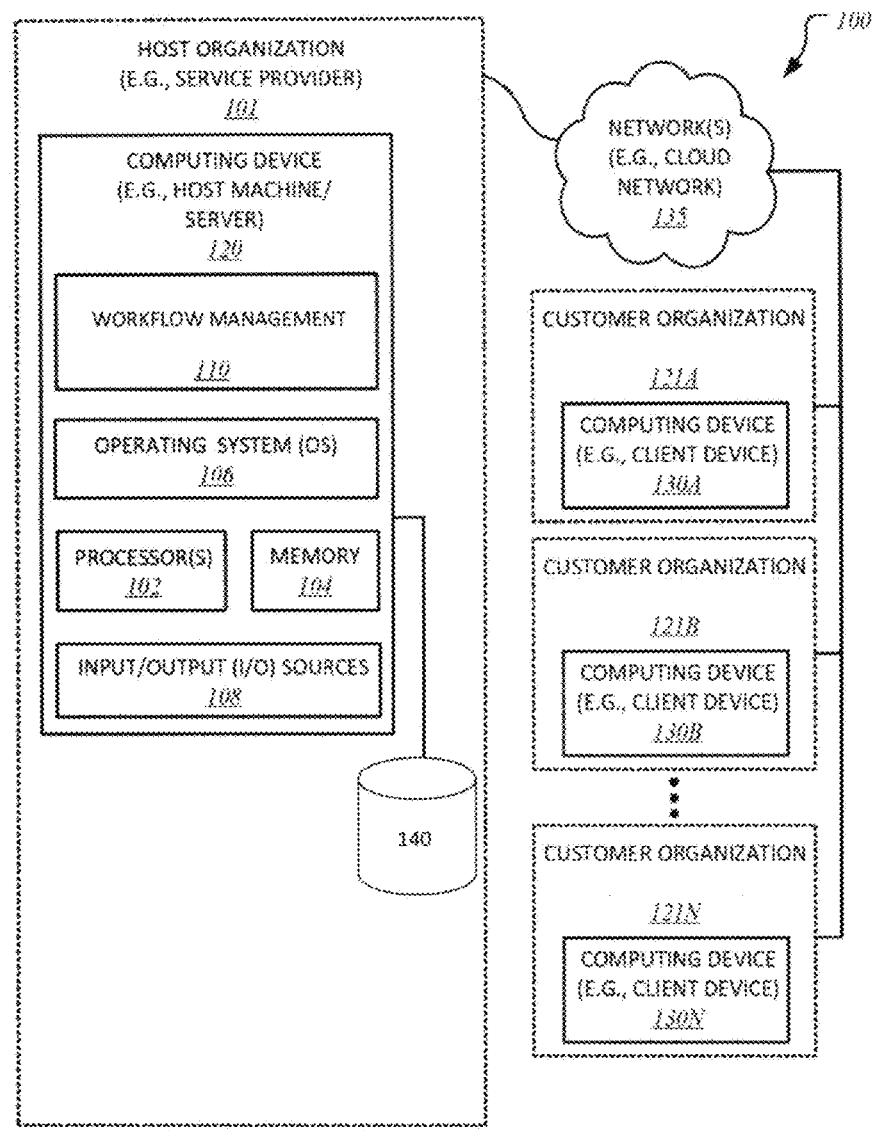
FIG. 1 illustrates a system having a computing device employing a workflow management mechanism according to one embodiment.

FIG. 1 illustrates a system 100 having a computing device 120 employing a workflow management mechanism 110 according to one embodiment. In one embodiment, computing device 120 includes a host server computer serving as a host machine for employing workflow management mechanism 110 to facilitate the processing of documents for printing at a printing service. Computing device 120 may include (without limitation) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may further employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc.

In one embodiment, the illustrated database(s) 140 store (without limitation) information and underlying database records having customer and user data therein on to process documents and/or print jobs on behalf of customer organizations 121A-N. In some embodiments, host organization 101 receives input and other requests from a plurality of customer organizations 121A-N over one or more networks 135; for example, incoming print job and/or document processing requests, or other inputs may be received from customer organizations 121A-N to be processed using database system 140.

In one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101. For example, incoming requests received at the web server may specify print services from host organization 101 are to be provided. Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

Figure 2:
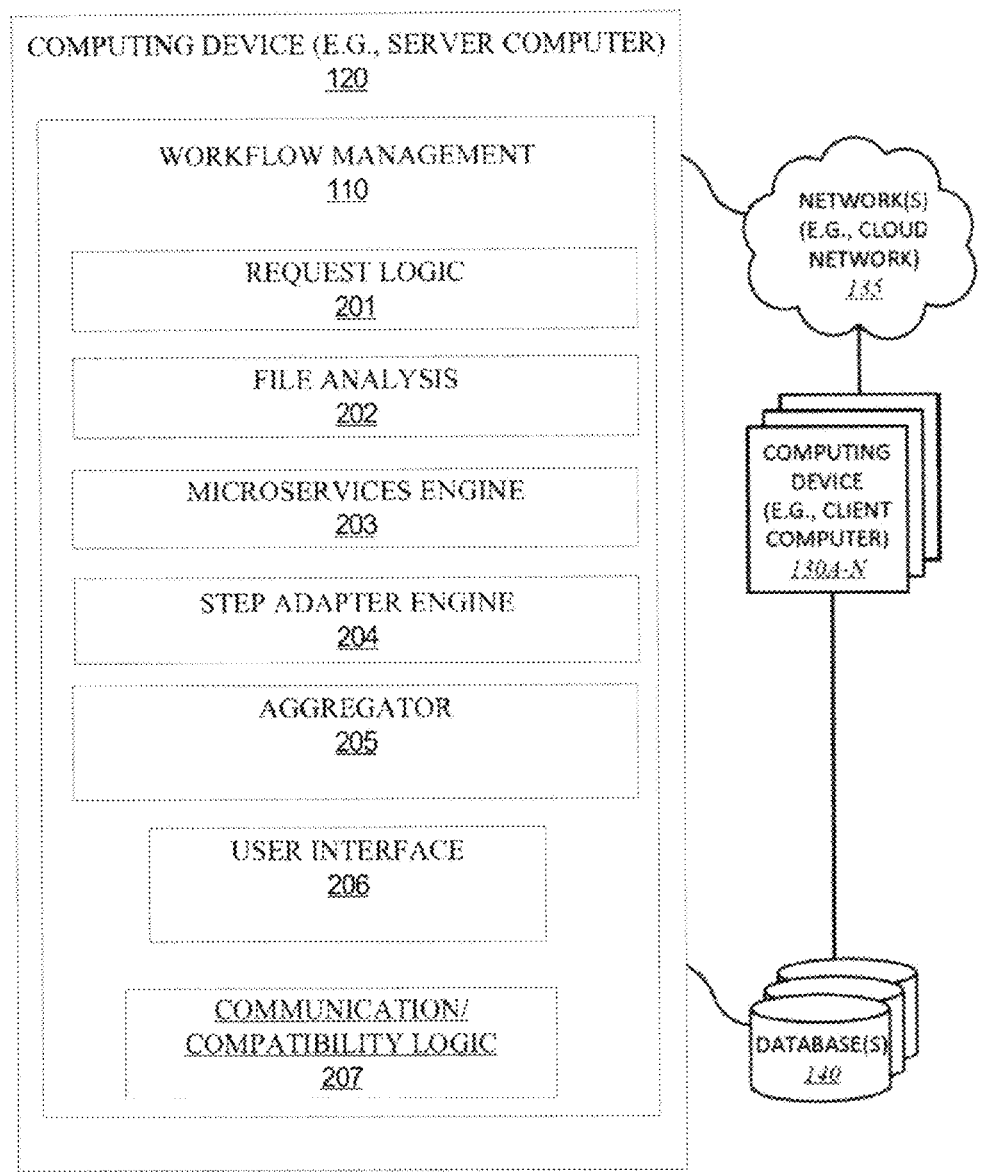
FIG. 2 illustrates a workflow management mechanism according to one embodiment.

FIG. 2 illustrates workflow management mechanism 110 of FIG. 1 according to one embodiment. In one embodiment, workflow management mechanism 110 may include any number and type of components, such as request logic 201, file analysis logic 202, microservices engine 203, step adapter engine 204, aggregator 205, user interface 206 and communication/compatibility logic 207.

In one embodiment, computing device 120 may include a server computer which may be further in communication with one or more databases or storage repositories, such as database(s) 140, which may be located locally or remotely over one or more networks, such as network(s) 135 (e.g., cloud network, Internet, proximity network, intranet, Internet of Things ("IoT"), Cloud of Things ("CoT"), etc.). Computing device 120 is further shown to be in communication with any number and type of other computing devices, such as client computing devices 130A-N, over one or more networks, such as network(s) 135.

In one embodiment, computing device 120 may serve as a service provider core for hosting and maintaining workflow management mechanism 110 as a software as a service (SaaS), and be in communication with one or more client computers 130A-N, over one or more network(s) 135, and any number and type of dedicated nodes. As aforementioned, with respect to FIG. 1, any number and type of requests may be received at or submitted for processing. For example, incoming requests may specify which services from computing device 120 are to be provided, such as printing and/or document processing requests, on behalf of one or more client devices 130A-N, code execution requests, and so forth.

Figure 3:
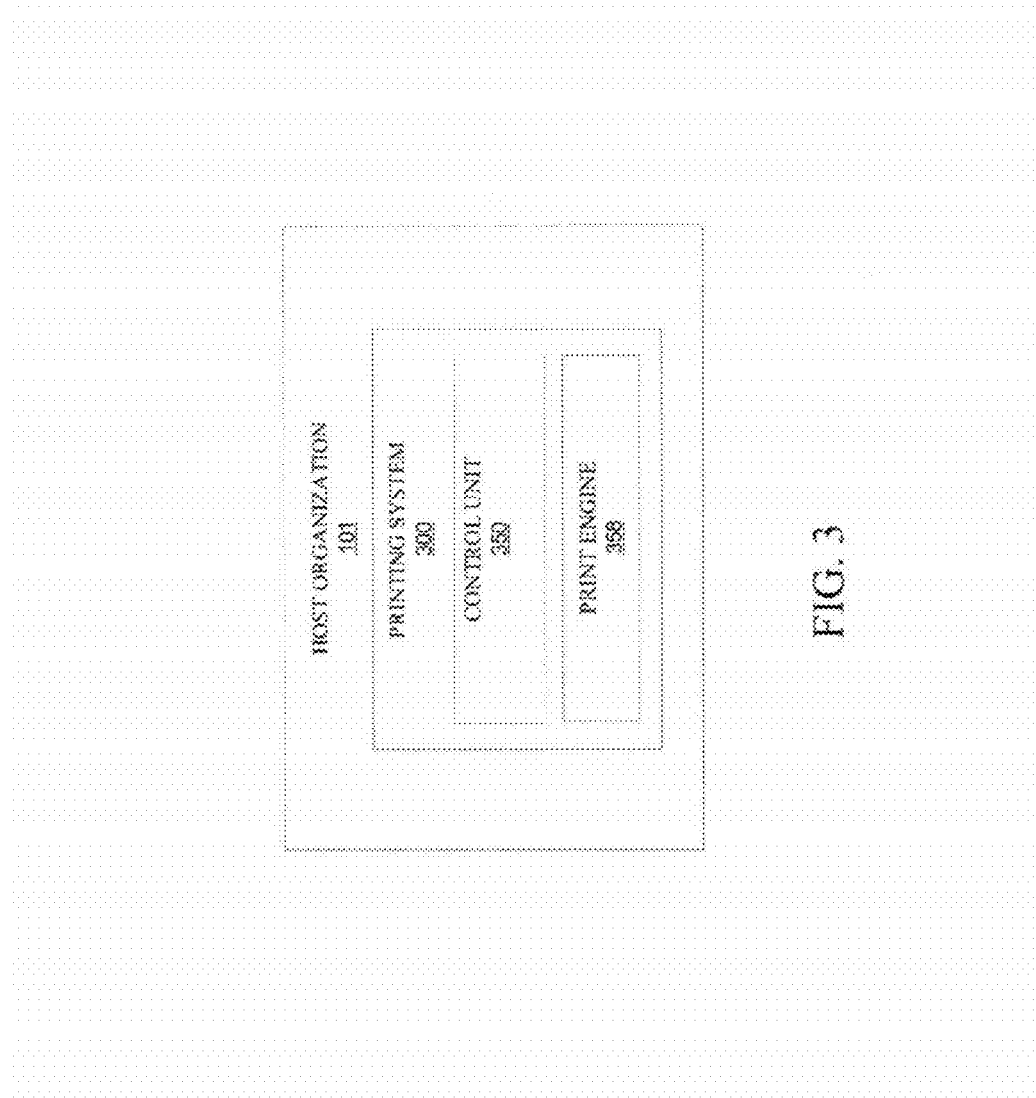
FIG. 3 illustrates one embodiment of a printing system.

According to one embodiment, host organization 101 may perform print services for client devices 130 via one or more printing systems. FIG. 3 illustrates one embodiment of such a printing system 300. Printer 300 includes a control unit 350 and a print engine 358. According to one embodiment, control unit 350 processes and renders objects received in print job data and provides sheet maps for printing to print engine 358. Control unit (e.g., DFE or digital front end) 350 is implemented to process image objects received at control unit 350 by a raster image processor (RIP) to convert an image described in a vector graphics format (e.g., shapes) into a raster image (e.g., pixels) that is to be stored as scan line data in a memory array (not shown) for output to print engine 358. In other embodiments, print engines 358 may be located at a facility associated with a customer organization 121. In such embodiments, control unit 350 processes print job information and transmits the raster images to remote print engines to produce the output.

Referring back to FIG. 2, workflow management mechanism 110 may be implemented to manage a large workflow of documents for print processing. Host organization 101 may receive print requests, some of which may include a high volume (e.g., thousands) of print jobs. Such a high volume may result in workflow management mechanism 110 having to efficiently process the requests to meet client SLAs. As discussed above, satisfying SLAs may become a problem in instances where the volume of print requests overwhelms the resources of computing device 120.

According to one embodiment, workflow management mechanism 110 implements a microservices architecture to process a workflow of print data without resource restrictions. In such an embodiment, workflow management mechanism 110 separates a workflow into multiple components according to the number of processing steps to be implemented to process the workflow and generates a microservice for each step based on file size and tuning parameters. In a further embodiment, the workload processing steps may be performed in parallel. Thus, a microservices implementation enables workflow management mechanism 110 to process each print file based on a determined number of steps, while using only the amount of necessary resources.

Frequently, workflow management mechanism 110 may receive large workflow files, which take a long time to process. Thus in a further embodiment, workflow management mechanism 110 analyzes received print job files and splits the file into two or more components (or segments) where necessary. In this embodiment, workflow management mechanism 110 determines whether a received print job file is too large or complex for a step to process the file at an acceptable rate, and automatically splits the workload for processing the print file into a determined number of segments that can be efficiently processed.

In one embodiment, the size of the file, a key structure of the file data stream and step tuning parameters are used to determine an acceptable rate for processing the step. As a result the actual file (e.g., Portable Document Format (PDF), Advanced Function Printing (AFP), Postscript (PS)), or corresponding metadata may be split into segments. According to one embodiment, the split segments are processed in parallel.

Once processing of the segments has been completed, the segments are re-combined (or merged) and forwarded to a subsequent step for processing. In some embodiments, the file may remain split in segments upon a determination that a subsequent processing step needs to be split as well. For example, an analysis of the subsequent step may determine that there was insufficient processing of the previous step to enable an SLA to be met. In this embodiment, the decision to merge is performed during the processing of the current step. This lookahead action enables the flow of data through the workflow at the most efficient rate.

Figure 4:
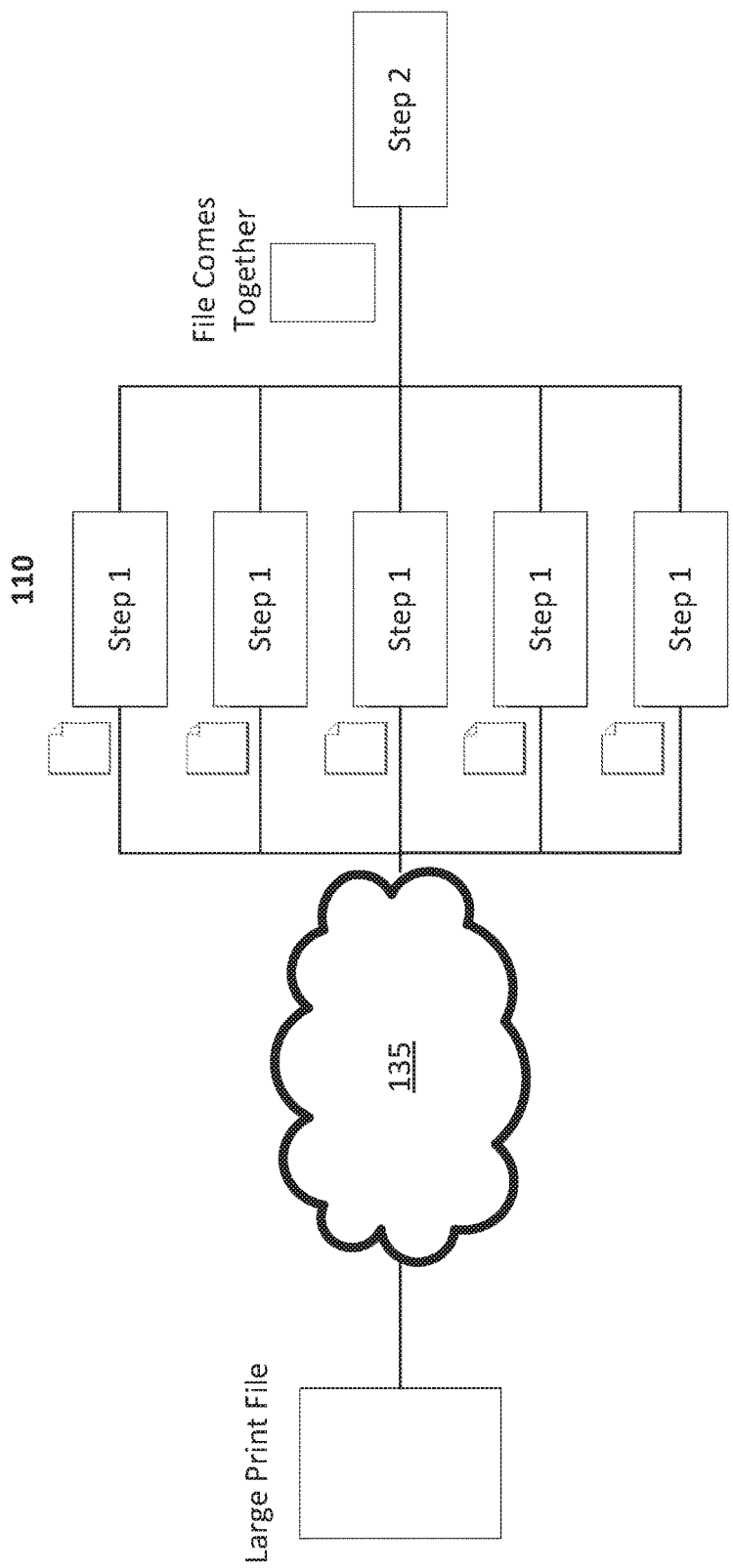
FIG. 4 illustrates another embodiment of a workflow management mechanism implemented in a cloud computing environment.

FIG. 4 illustrates one embodiment of workflow management mechanism 110 as a microservices implementation in a cloud computing environment. As shown in FIG. 4, a print file is received and split into five segments in a first processing step (step 1). Subsequently, the steps are merged prior to proceeding to a second processing step (step 2) for processing.

In one embodiment, computing device 120 may implement request logic 201 to serve as a request interface via a web server or as a stand-alone interface, such as user interface 206, to receive request packets or other requests from the client devices 130A-N. The request interface may further support the return of response packets or other replies and responses in an outgoing direction from computing device 120 to one or more client devices 130A-N.

In a further embodiment, request logic 201 receives requests from a customer organization to perform print services for one or more print job files submitted to computing device 120 with a request. File analysis logic 202 analyzes a received print job file to determine the number of processing steps to be implemented to process the file. In such an embodiment, analysis logic 202 analyzes the file by examining the processes that are to be performed on the file (e.g., transform, halftoning, etc.) and compute resources necessary to process the file. Thus, file analysis logic 202 may separate the workflow process into two or more processing steps (or step components) based on a determination of the efficient resource usage for file processing.

Microservices engine 203 generates a microservice to process each of the steps determined by analysis logic 202. In one embodiment, a microservice is generated based on the file size and tuning parameters of each step. As discussed above, two or more of the generated microservices may be processed in parallel. Step adapter engine 204 manages the processing of each step at a microservice generated by microservices engine 203.

According to one embodiment, step adapter engine 204 analyzes each step allocated by analysis logic 202 to determine whether a step is to be split into two or more segments. During the analysis, step adapter engine 204 may determine a quantity of time required for each step to access various data sets, whether any of the data has an SLA that must be met, as well as other steps that need access to the data to meet the SLA or Deadline. In one embodiment, step adapter engine 204 may implement one or more supervised machine learning models to determine how steps are to be split. In such an embodiment, step adapter engine 204 may access characteristic data for one or more previously processed files having similarities to the current file and split a step into segments based on successful processing of the previous files.

For example, a 100,000 page print job having a four hour completion deadline may be received into the workflow. In this example, file analysis logic 202 may determine that the file is to be segmented into five processing steps. Accordingly, step adapter engine 204 will recognize that the first step is a transform step and recognize from data from previously processed jobs that a transform step performed on 100,000 pages requires four hours to process, while the other four steps require an hour total of processing time. Based on this analysis, step adapter engine 204 may split the transform step into two segments to enable the step to be processed within two hours. As a result, the deadline will be met by the processing all five steps in approximately three hours.

Aggregator 205 merges the split segments once processing has been completed. As discussed above, the segments may be re-combined prior to being forwarded to a subsequent step for processing, or may remain split in segments upon a determination that the next step needs to be split as well.

Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

Figure 5:
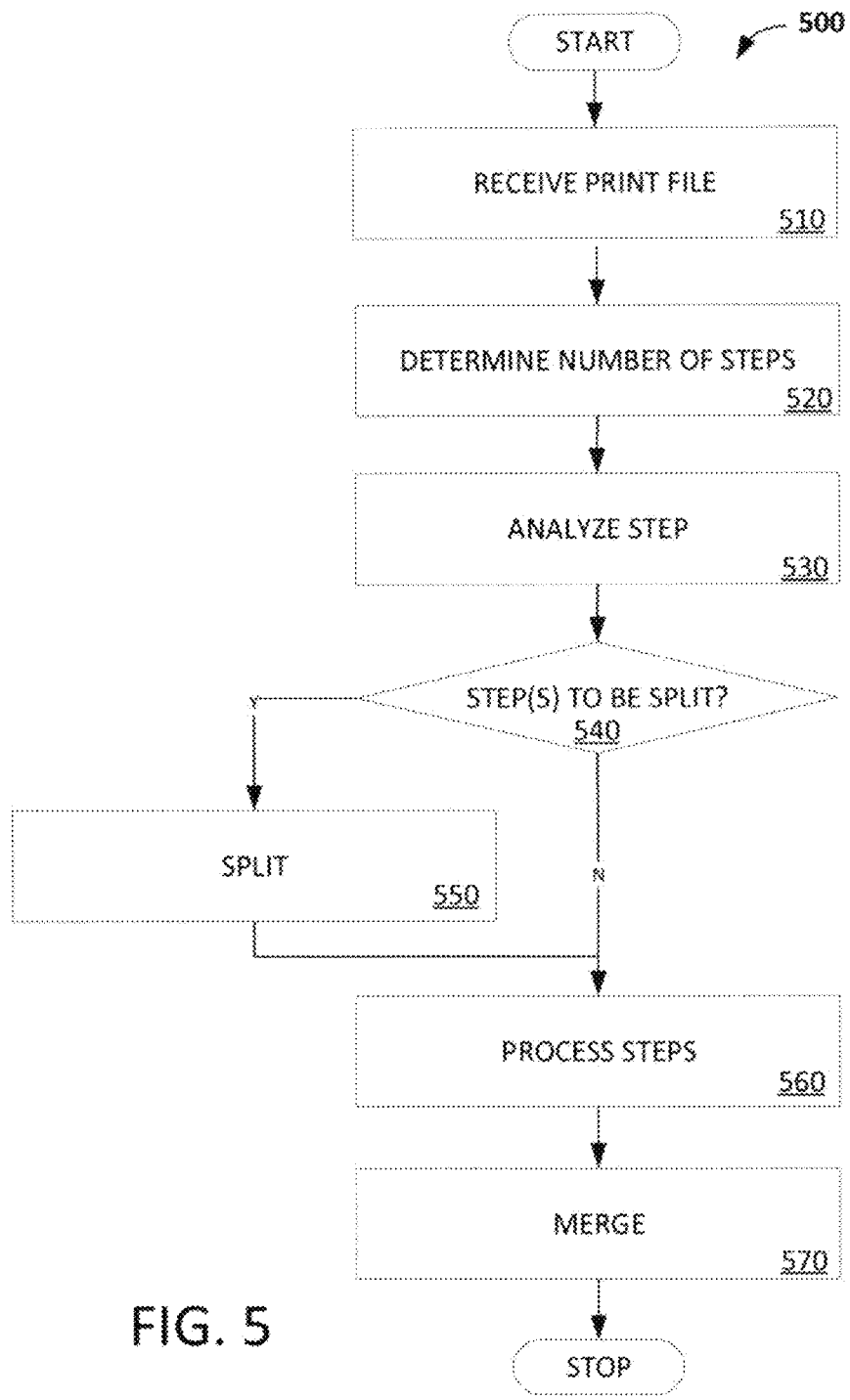
FIG. 5 is a flow diagram illustrating one embodiment of a process for performing workflow management.

FIG. 5 is a flow diagram illustrating one embodiment of a process 500 to perform workflow management. Process 500 may be performed by processing logic that may comprise hardware (e.g., circuitry, dedicated logic, programmable logic, etc.), software (such as instructions run on a processing device), or a combination thereof. In one embodiment, process 500 may be performed by workflow management mechanism 110. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

Process 500 begins at processing block 510, where a print file is received into the workload. At processing block 520, the number of steps to process the file is determined. At processing block 530, the steps are analyzed. In one embodiment, the analysis includes a determination of the time to process the job, as well as the time required to perform each of the processing steps. As discussed above, the analysis may use characteristic data from previously processed jobs to determine the most efficient manner to process the current file.

Figure 6:
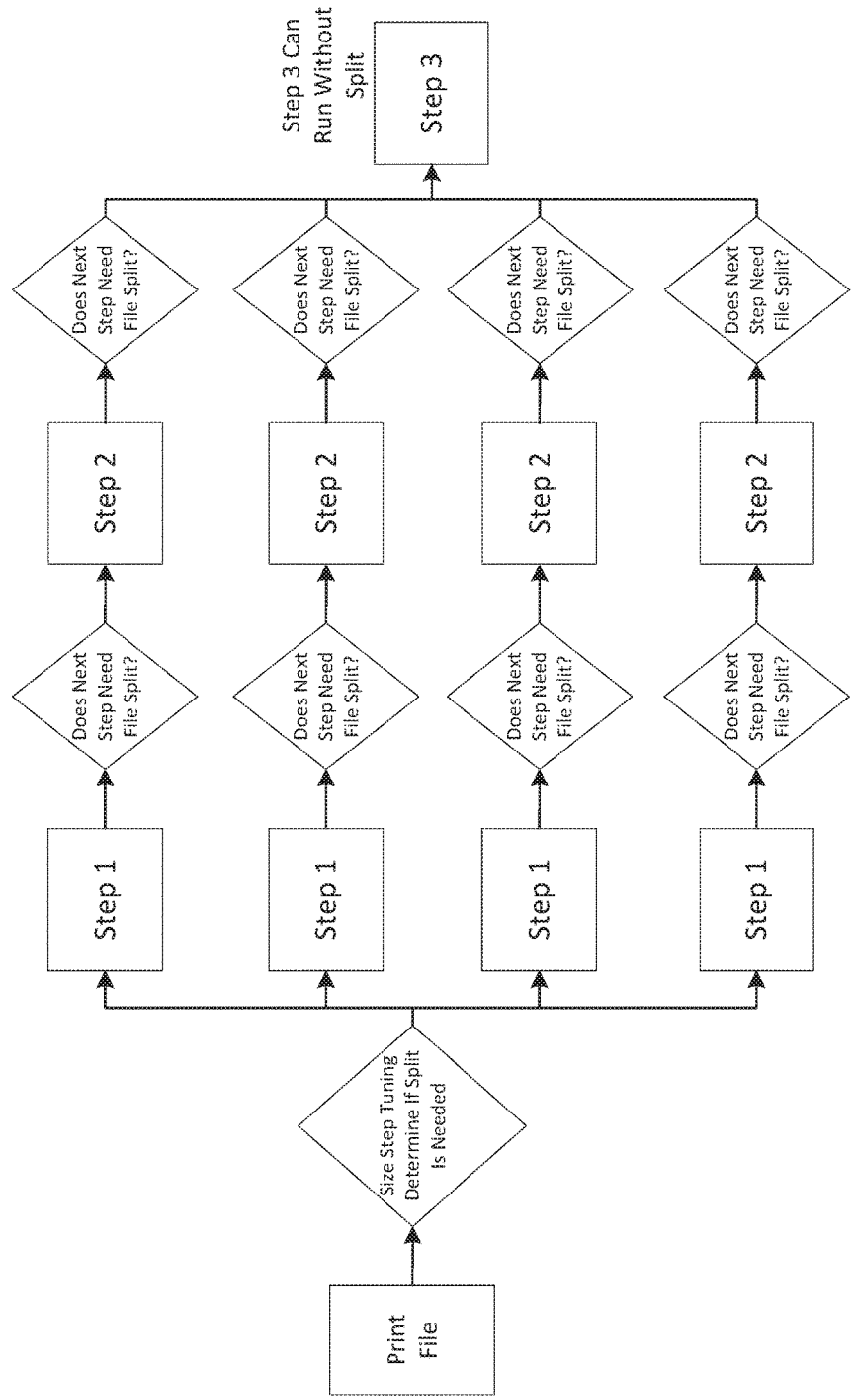
FIG. 6 is a flow diagram illustrating another embodiment of a process for performing workflow management.

At decision block 540, a determination is made as to whether one or more of the steps are to be split. If so, the one or more steps are split into a determined number of segments, processing block 550. In either scenario, the step processing is performed at processing block 560. At processing block 570, the steps are merged as previously discussed. FIG. 6 is a flow diagram illustrating another embodiment of a method for performing workflow management. As shown in FIG. 6, the file remains split when forwarded from Step 1 to Step 2 upon a determination that the file is to remain segmented at Step 2. However, the file is merged after the Step 2 processing prior to being forwarded to Step 3.

Figure 7A:
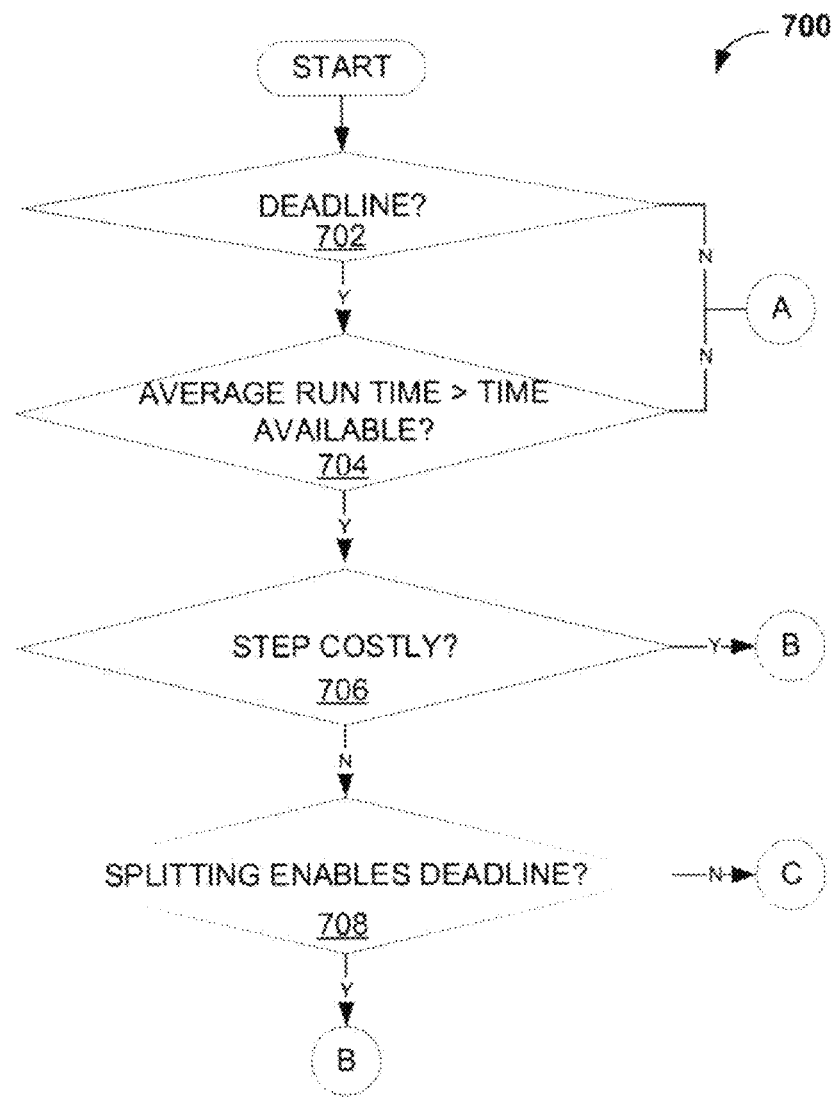
FIGS. 7A&7B is a flow diagram illustrating one embodiment of a process for performing a workflow split.
Figure 7B:
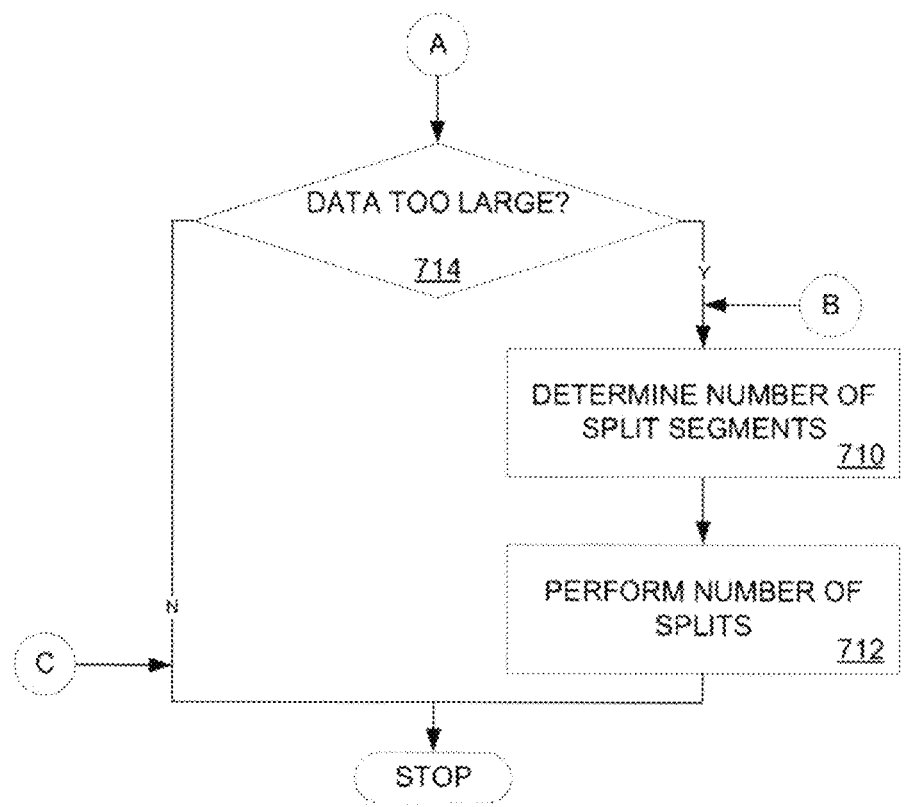

FIGS. 7A&7B is a flow diagram illustrating one embodiment of a process 700 for performing a split on a step. Process 700 may be performed by processing logic that may comprise hardware (e.g., circuitry, dedicated logic, programmable logic, etc.), software (such as instructions run on a processing device), or a combination thereof. In one embodiment, process 700 may be performed by step adapter engine 204. The process 700 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-6 are not discussed or repeated here.

Process 700 begins in FIG. 7A at processing block 702, where there is a determination as to whether a deadline exists for the processing and/or printing of a received print file. If so, a determination is made as to whether the average time to process all steps in the file is greater than the time available based on the deadline, decision block 704. If the processing time is greater, a determination is made as to whether the current step is costly (e.g., processing time of the current step exceeds the average time to process all steps), decision block 706. If not, a determination is made as to whether splitting the step enables the deadline to be achieved, decision block 708.

A number of segments into which to split the step is determined upon a determination that splitting the step enables the deadline to be met, processing block 710 (FIG. 7B). In one embodiment, the step is split into a number of segments that would make a difference in decreasing processing time. In another embodiment, the number of splits may be determined based on how much the time to process the step exceeds the average processing time. Thus, the step may be split into a number of segments commensurate with how much it exceeds the processing time (e.g., splint into 4 if step is 4× larger). At processing block 712, the determined number of splits is performed.

If at decision block 702, a determination is made that a deadline does not exist for the received print file, a determination is made as to whether the amount of data for the step is too large to be efficiently processed, decision block 714 (FIG. 7B). If the data is too large, control is returned to processing block 710, where the number of splits is determined, and the splits are performed prior to performing the splits (processing block 712). If at decision block 714, a determination is made that the data is not too large, the process is completed since the step does not need to be split.

If at decision block 704, a determination is made that the average time to process all steps is less than the time available, control is returned to decision block 714, where the determination is made as to whether the amount of data for the step is too large to be efficiently processed. If at decision block 706, a determination is made that the step is costly, control is returned to processing block 710. If at decision block 708, a determination is made that splitting the step does not enable the deadline to be met, the process is completed since the step does not need to be split.

The above-described mechanism enables print workflows to process large volume print jobs without the lag-time associated with on-premise printing systems.

Figure 8:
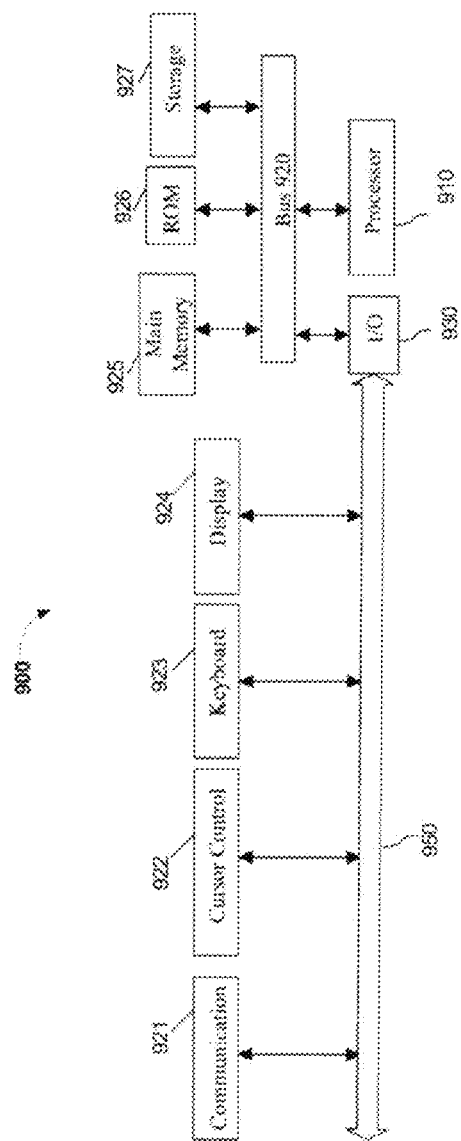
FIG. 8 illustrates a computing device suitable for implementing embodiments of the present disclosure.

FIG. 8 illustrates a computer system 900 on which computing device 120 and/or 121 may be implemented. Computer system 900 includes a system bus 920 for communicating information, and a processor 910 coupled to bus 920 for processing information.

Computer system 900 further comprises a random-access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 927 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., a keyboard (or alphanumeric input device) 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments may be implemented as any or a combination of: one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A non-transitory computer-readable medium having stored thereon instructions that, when executed by one or more processors, cause the one or more processors to:
   receive a print file to be processed;
   determine a number of processing steps to be implemented to process the print file;
   generate a microservice corresponding to each of the step components;
   process each of the step components via a corresponding microservice for printing; and
   transmit the print file to be printed based on the processing of the step components.

2. The computer-readable medium of claim 1, having stored thereon instructions that, when executed by one or more processors, further cause the one or more processors to:
   split the print file into two or more segments for processing at a first processing step; and
   process the two or more segments at the first processing step.

3. The computer-readable medium of claim 2, having stored thereon instructions that, when executed by one or more processors, further cause the one or more processors to merge the two or more segments after processing after the first processing step has been completed.

4. The computer-readable medium of claim 3, having stored thereon instructions that, when executed by one or more processors, further cause the one or more processors to:
   determine that the print file is to be split into two or more segments for processing at a second processing step;
   process the two or more segments at the second processing step; and
   merge the two or more segments after processing after the first processing step has been completed.

5. The computer-readable medium of claim 4, wherein the determination of whether the print file is to be split into two or more segments is based on a performance of the first processing step and whether a deadline exists for processing of the print file.

6. The computer-readable medium of claim 2, having stored thereon instructions that, when executed by one or more processors, further cause the one or more processors to analyze the first processing step to determine whether the print file is to be split into the two or more segments.

7. The computer-readable medium of claim 6, wherein analyzing the first processing step comprises:
   determining a number of segments in which to split the print file; and
   performing the split into the determined number of segments.

8. The computer-readable medium of claim 7, wherein analyzing the first processing step further comprises:
   determining whether a deadline exists for processing of the print file; and
   determining whether performing a split into the two or more segments would enable the deadline to be achieved.

9. The computer-readable medium of claim 8, wherein analyzing the first processing step further comprises determining whether the first processing step is too large to be processed efficiently.

10. The computer-readable medium of claim 2, wherein the two or more segments are processed in parallel.

11. A system comprising:
   at least one physical memory device; and
   one or more processors coupled with the at least one physical memory device, the one or more processors to receive a print file to be processed, determine a number of processing steps to be implemented to process the print file, generate a microservice corresponding to each of the step components, process each of the step components via a corresponding microservice for printing and transmit the print file to be printed based on the processing at the step components.

12. The system of claim 11, wherein the one or more processors further split the print file into two or more segments for processing at a first processing step and process the two or more segments at the first processing step.

13. The system of claim 12, wherein the one or more processors further merge the two or more segments after processing after the first processing step has been completed.

14. The system of claim 13, wherein the one or more processors further determine that the print file is to be split into two or more segments for processing at a second processing step, process the two or more segments at the second processing step; and merge the two or more segments after processing after the first processing step has been completed.

15. The system of claim 13, wherein the one or more processors further analyze the first processing step to determine whether the print file is to be split into the two or more segments.

16. The system of claim 15, wherein analyzing the first processing step comprises determining a number of segments in which to split the print file and performing the split into the determined number of segments.

17. The system of claim 15, wherein analyzing the first processing step further comprises determining whether a deadline exists for processing of the print file and determining whether performing a split into the two or more segments would enable the deadline to be achieved.

18. The system of claim 15, wherein analyzing the first processing step further comprises determining whether the first processing step is too large to be processed efficiently.

19. The system of claim 11, wherein the step components are processed in parallel at the corresponding microservices.

20. The system of claim 12, wherein the two or more segments are processed in parallel.

* * * * *